United States Patent
Yoo

(10) Patent No.: US 11,603,471 B2
(45) Date of Patent: Mar. 14, 2023

(54) COATING COMPOSITION FOR TUBE OF HEAT EXCHANGER AND COATING METHOD FOR TUBE OF HEAT EXCHANGER USING THE SAME

(71) Applicants: Hyundai Motor Company, Seoul (KR); KIA Motors Corporation, Seoul (KR)

(72) Inventor: Chang Yeol Yoo, Suwon-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 641 days.

(21) Appl. No.: 16/600,731

(22) Filed: Oct. 14, 2019

(65) Prior Publication Data

US 2021/0071008 A1    Mar. 11, 2021

(30) Foreign Application Priority Data

Sep. 6, 2019    (KR) .......................... 10-2019-0110981

(51) Int. Cl.
| | | |
|---|---|---|
| *B23K 1/20* | (2006.01) | |
| *C09D 1/00* | (2006.01) | |
| *B23K 1/00* | (2006.01) | |
| *B23K 101/14* | (2006.01) | |

(52) U.S. Cl.
CPC .............. *C09D 1/00* (2013.01); *B23K 1/0012* (2013.01); *B23K 1/203* (2013.01); *B23K 2101/14* (2018.08)

(58) Field of Classification Search
None
See application file for complete search history.

(56) References Cited

U.S. PATENT DOCUMENTS

| | | | |
|---|---|---|---|
| 9,433,996 | B2 | 9/2016 | Wintersteen et al. |
| 10,138,559 | B2 * | 11/2018 | Mizuno ................... C08K 3/30 |
| 2008/0038471 | A1 | 2/2008 | Boger et al. |
| 2010/0051247 | A1 | 3/2010 | Sogabe et al. |
| 2014/0033534 | A1 | 2/2014 | Wintersteen et al. |
| 2014/0234544 | A1 | 8/2014 | Takada et al. |
| 2020/0291527 | A1 | 9/2020 | Cho et al. |

FOREIGN PATENT DOCUMENTS

| | | |
|---|---|---|
| CN | 1890047 A | 1/2007 |
| CN | 101035926 A | 9/2007 |
| CN | 103502768 A | 1/2014 |
| CN | 103857828 A | 6/2014 |
| CN | 105164314 A | 12/2015 |
| JP | 2005-118857 A | 5/2005 |
| JP | 2013-067828 A | 4/2013 |
| JP | 2013-213282 A | 10/2013 |
| KR | 10-2014-0013040 A | 2/2014 |
| KR | 10-2019-0054283 A | 5/2019 |

OTHER PUBLICATIONS

Korean Office Action dated Jan. 18, 2021 from the corresponding Korean Application No. 10-2019-0110981, 5 pp.
Korean Office Action dated Jul. 20, 2021 from the corresponding Korean Application No. 10-2019-0110981, 4 pp.
Office Action issued in related application No. CN 201911077566.3, dated Dec. 15, 2022 (21 pages).

* cited by examiner

*Primary Examiner* — Daniel J. Schleis
(74) *Attorney, Agent, or Firm* — Lempia Summerfield Katz LLC

(57) ABSTRACT

A coating composition for a heat exchanger tube including vanadium (V), a flux, and a binder, wherein the vanadium is included in an amount of 28 to 38 parts by weight with respect to 100 parts by weight of the composition, and a coating method of a heat exchanger tube using the same are provided.

6 Claims, No Drawings

COATING COMPOSITION FOR TUBE OF HEAT EXCHANGER AND COATING METHOD FOR TUBE OF HEAT EXCHANGER USING THE SAME

CROSS-REFERENCE TO RELATED APPLICATION

This application claims priority to and the benefit of Korean Patent Application No. 10-2019-0110981, filed on Sep. 6, 2019, the entire contents of which are incorporated herein by reference.

FIELD

The present disclosure relates to a coating composition for a heat exchanger tube which is capable of forming a coating layer excellent in corrosion resistance and a coating method of a tube for a heat exchanger using the same.

BACKGROUND

The statements in this section merely provide background information related to the present disclosure and may not constitute prior art.

A condenser and an evaporator core of a heat exchanger of a vehicle are typically composed of a tube and a pin. The heat exchanger tube is mainly made of aluminum, is a device for transferring heat from a high temperature fluid to a low temperature fluid through a heat transfer wall, and serves as a passage of a refrigerant or a heat medium. In addition, the pin for the heat exchanger serves to maximize cooling or heating efficiency and is mainly made of aluminum. Here, the heat exchanger tube is generally manufactured by extruding aluminum wire into a tube shape.

Furthermore, in the heat exchanger tube, a coating composition including a metal, a binder, and a flux (mixed salt) is coated on a surface of the heat exchanger tube and is brazed to form a coating layer, which increases corrosion resistance. In the heat exchanger tube including the coating layer, when corrosion occurs, only the coating layer may be corroded to inhibit the base aluminum tube from corroding.

In detail, Japanese Patent Laid-Open No. 2005-118857 (Patent Document 1) discloses an apparatus for coating a paint mixed in a mechanical binder on a surface of a member for aluminum alloy heat exchanger assembled by a brazing processing using a top feed roll transfer method including at least three rolls. However, although the coating apparatus of Patent Document 1 may form the coating layer having a uniform thickness, there is a limit in improving the corrosion resistance of a member.

Therefore, there is a need for research and development of a coating composition for the heat exchanger tube capable of forming the coating layer having excellent corrosion resistance and chipping resistance.

(Patent Document 1) Japanese Patent Laid-Open No. 2005-118857 (Published Date: May 12, 2005)

The above information disclosed in this Background section is only for enhancement of understanding of the background of the present disclosure, and therefore it may contain information that does not form the prior art that is already known to a person of ordinary skill in the art.

SUMMARY

In one aspect, the present disclosure provides a coating composition for a heat exchanger tube capable of forming a coating layer excellent in corrosion resistance and chipping resistance.

According to an aspect of the present disclosure, a coating composition for a heat exchanger tube includes vanadium (V), a flux, and a binder, wherein the vanadium is included in an amount of 28 to 38 parts by weight with respect to 100 parts by weight of the composition.

According to an aspect of the present disclosure, a heat exchanger tube includes a metallic base material; and an anti-corrosive reinforcement layer that is formed on the metallic base material and is derived from the coating composition for the heat exchanger tuber.

According to an aspect of the present disclosure, a coating method of a heat exchanger tube includes coating the coating composition for the heat exchanger tube on a surface of a metallic base material to form a coating layer;

joining the metallic base material, on which the coating layer is formed, by brazing; and heat-treating the brazed metallic base material to form an anti-corrosive reinforcement layer.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

Hereinafter, the present disclosure will be described in detail.

In the present specification, when a member is located "on" another member, this includes not only when one member is in contact with another member but also when another member exists between the two members.

In the present specification, when a part is said to "include" a certain component, it means that it may further include other components, without excluding the other components unless specifically stated otherwise.

Coating Composition for Heat Exchanger Tube

The coating composition for the heat exchanger tube according to the present disclosure includes vanadium (V), a flux, and a binder.

Vanadium (V)

Vanadium (V) serves to improve corrosion resistance by forming a coating layer containing vanadium dioxide ($VO_2$) on a surface of the heat exchanger tube.

The vanadium may be included in an amount of 28 to 38 parts by weight, or 30 to 40 parts by weight with respect to 100 parts by weight of the composition. When the content of the vanadium is within the above range, there is an effect of improving the corrosion resistance.

Flux

A flux serves to improve formability of the coating layer containing vanadium dioxide by removing an oxide layer on the surface of the heat exchanger tube.

The flux is not particularly limited as long as the flux is generally applicable to the coating composition for the heat exchanger tube, for example, includes a fluoride-based flux, a chloride-based flux, a borate-based flux, and the like.

Here, the fluoride-based flux may include at least one selected from the group consisting of KF, $AlF_3$, $KAlF_4$, $KAlF_5$, $K_2AlF_5$, $K_3AlF_6$, CsF, RbF, LiF, NaF, $Ca_2F$, and $KZnF_3$.

KAIF$_4$

In addition, the flux may be included in the composition in an amount of 45 to 70 parts by weight, or 50 to 60 parts by weight with respect to 30 to 40 parts by weight of vanadium (V). When the flux content is within the above range, there is an effect of maximizing the oxide layer removal.

Binder

A binder serves to increase bonding strength of the components in the composition to improve the coating layer formability.

The binder may include at least one selected from the group consisting of a polyvinyl-based resin, an acrylic-based resin, and a urethane-based resin.

In addition, the binder may be included in the composition in an amount of 1 to 20 parts by weight, 5 to 15 parts by weight, or 5 to 10 parts by weight with respect to 30 to 40 parts by weight of vanadium. When the content of the binder is within the above range, there is an effect of maximizing the bonding strength of the composition.

Heat Exchanger Tube

A heat exchanger tube according to the present disclosure include a metallic base material; and an anti-corrosive reinforcement layer, which is formed on the metallic base material and is derived from the coating composition for the heat exchanger tube.

Metallic Base Material

The metallic base material is a base material constituting the heat exchanger tube. In addition, the metallic base material may be not particularly limited as long as it is commonly used in the heat exchanger tube, for example, may include at least one selected from the group consisting of aluminum, copper and stainless steel. In detail, the metallic base material may be made of aluminum.

The metallic base material may be in the form of a tube.

Anti-Corrosive Reinforcement Layer

The anti-corrosive reinforcement layer is formed on the metallic base material, and is corroded instead of the metallic base material when corrosion occurs, thereby effectively preventing or inhibiting the corrosion of the metallic base material.

Here, the anti-corrosive reinforcement layer may include vanadium dioxide ($VO_2$). When anti-corrosive reinforcement layer includes vanadium dioxide, the anti-corrosive reinforcement layer is corroded instead of the metallic base material when the corrosion occurs, thereby effectively preventing or inhibiting the corrosion of the metallic base material.

In addition, the anti-corrosive reinforcement layer may have an average thickness of 1 to 1,000 μm, 5 to 500 μm, or 10 to 100 μm. When the average thickness of the anti-corrosive reinforcement layer is within the above range, there is an effect that the corrosion resistance of the manufactured heat exchanger tube is improved.

The heat exchanger tube as described above is excellent in the corrosion resistance and chipping resistance because the anti-corrosive reinforcement layer is corroded instead of the metallic base material when the corrosion occurs.

Coating Method of Heat Exchanger Tube

The coating method of the heat exchanger tube according to the present disclosure includes coating the coating composition for the heat exchanger tube on the surface of the metallic base material to form the coating layer; joining the metallic base material, on which the coating layer is formed, by brazing; and heat-treating the brazed metallic base material to form the anti-corrosive reinforcement layer.

Coating

The coating composition for the heat exchanger tube is coated on the surface of the metallic base material to form the coating layer.

The coating may be a roll coating. The roll coating may transfer the metallic base material at a rate of 1 to 10 m/min or 1 to 5 m/min and may provide the coating composition at a rate of 0.1 to 5 g/min or 0.1 to 1 g/min. Here, when the transfer rate of the metallic base material and the feed rate of the coating composition during the roll coating is within the above range, the coating layer having a uniform and appropriate thickness is formed on the surface of the metallic base material to improve the corrosion resistance and chipping resistance of the metallic base material.

Joining

The metallic base material on which the coating layer is formed is brazed. Here, vanadium in the coating composition for the heat exchanger tube may be diffused into the metallic base material by brazing.

The brazing may be performed for 1 to 15 minutes or 4 to 12 minutes at 350 to 650° C. or 400 to 600° C. In detail, the brazing is carried out for 1 to 7 minutes or 3 to 7 minutes at 350 to 430° C. or 380 to 420° C., or is carried out for 8 to 15 minutes or 8 to 12 minutes at 500 to 650° C. or 550 to 620° C. When the temperature and time during the brazing are within the above range, there is an effect of improving a brazing property.

Heat-Treating

The brazed metallic base material is heat-treated to form the anti-corrosive reinforcement layer.

The heat-treating may be a high frequency heat treatment of a frequency 150 to 350 kHz. In detail, the high frequency heat treatment may process a high frequency of 200 to 300 kHz for 3 to 15 minutes or 5 to 10 minutes. When the frequency and the treatment time of the high frequency are within the above range, vanadium dioxide ($VO_2$) is generated in the anti-corrosive reinforcement layer, thereby improving the corrosion resistance and chipping resistance of the metallic base material.

Hereinafter, the present disclosure will be described in more detail with reference to Examples. However, Examples are only for the understanding of the present disclosure, and the scope of the present disclosure in any sense is not limited to Examples.

EXAMPLES

Example 1. Manufacturing Coating Composition for Heat Exchanger Tube

A coating composition was prepared by mixing 35 parts by weight of vanadium (V), 55 parts by weight of KAIF$_4$, and 10 parts by weight of a binder (Manufacturer: Ternary Chemical, Product name: HF-66B, acrylic resin).

Comparative Examples 1 to 5

Coating compositions were prepared in the same manner as Example 1, except that the components were mixed in the amounts shown in Table 1 below.

TABLE 1

| Component (parts by weight) | Example 1 | Comparative Example 1 | Comparative Example 2 | Comparative Example 3 | Comparative Example 4 | Comparative Example 5 |
|---|---|---|---|---|---|---|
| Vanadium (V) | 35 | — | — | 15 | 25 | 45 |
| Zirconium (Zr) | — | 35 | — | — | — | — |
| Titanium (Ti) | — | — | 35 | — | — | — |
| KAlF$_4$ | 55 | 55 | 55 | 55 | 55 | 55 |
| Binder | 10 | 10 | 10 | 10 | 10 | 10 |
| Total | 100 | 100 | 100 | 80 | 90 | 110 |

Test Example 1: Evaluation of Corrosion Resistance

An aluminum base material (Manufacturer: Ilsimalmax, Product name: A3003, Thickness: 200 μm) was roll coated with the coating compositions of Example and Comparative Examples. Here, the metallic base material was provided at a rate of 3 m/min and the coating composition was provided in an amount of 5 g/m2 to be coated on the metallic base material.

Hereafter, the coated aluminum base material was brazed at 400° C. for 5 minutes to diffuse vanadium into the aluminum base material.

Then, the brazed aluminum base material was treated with a high frequency of 250 KHz for 8 minutes to form the anti-corrosive reinforcement layer having an average thickness of 100 μm containing vanadium dioxide and thus, a specimen was manufactured.

Subsequently, salt water was treated on the specimen in an amount of 100 mL/m$^2$, and a corrosion depth was measured after 1,000 hours, and results were shown in Table 2. Here, the salt water was used an aqueous solution containing 5% by weight of salt.

TABLE 2

| Categories | Depth Of Corrosion (μm) |
|---|---|
| Example 1 | 50 |
| Comparative Example 1 | 100 |
| Comparative Example 2 | 200 |
| Comparative Example 3 | 200 |
| Comparative Example 4 | 100 |
| Comparative Example 5 | 100 |

As shown in Table 2, Example 1 including vanadium had a significantly lower corrosion depth in comparison with Comparative Examples 1 and 2, which contain the same amount of metal as Example 1. In addition, Example 1 had a significantly shallower corrosion depth in comparison with Comparative Examples 3 to 5 containing less or more amounts of vanadium than the amount of vanadium of Example 1. Therefore, it was possible to confirm the remarkably excellent corrosion resistance of the specimen of Example 1 in comparison to the specimens of Comparative Examples 1 to 5.

Test Example 2: Evaluation of Chipping Resistance

Pebbles of 3 mm in diameter and 100 g in weight were sprayed onto the specimens prepared in the same manner as in Test Example 1 at a pressure of 5 kgf/cm$^2$ for 10 seconds at 90° angle, and then a damage depth of each specimen surface was measured. Measurement results were shown in Table 3.

TABLE 3

| | Damage Depth (μm) |
|---|---|
| Example 1 | 50 |
| Comparative Example 1 | 100 |
| Comparative Example 2 | 200 |
| Comparative Example 3 | 200 |
| Comparative Example 4 | 100 |
| Comparative Example 5 | 100 |

As shown in Table 3, the specimen of Example 1 has the damage depth, which is significantly shallow in comparison to the specimens of Comparative Examples 1 to 5 to be significantly excellent in the chipping resistance.

The coating composition for the heat exchanger tube according to the present disclosure is capable of forming the coating layer excellent in corrosion resistance and chipping resistance.

While this present disclosure has been described in connection with what is presently considered to be practical exemplary forms, it is to be understood that the present disclosure is not limited to the disclosed forms, but, on the contrary, it is intended to cover various modifications and equivalent arrangements included within the spirit and scope of the present disclosure.

What is claimed is:

1. A heat exchanger tube comprising:
 a metallic base material; and
 an anti-corrosive reinforcement layer positioned on a surface of the metallic base material,
 wherein the anti-corrosive reinforcement layer is derived from a coating composition comprising vanadium (V), a flux, and a binder,
 wherein the vanadium is included in an amount in a range of 30 to 40 parts by weight with respect to 100 parts by weight of the coating composition, and
 wherein the anti-corrosive reinforcement layer comprises vanadium dioxide (VO$_2$).

2. The heat exchanger tube of claim 1, wherein the metallic base material comprises aluminum, copper, stainless steel, or combinations thereof.

3. The heat exchanger tube of claim 1, wherein the anti-corrosive reinforcement layer has an average thickness in a range of 1 to 1,000 μm.

4. The heat exchanger tube of claim 1, wherein the metallic base material comprises diffused vanadium from the coating composition.

5. The heat exchanger tube of claim 1, wherein the anti-corrosive reinforcement layer has an average thickness in a range of 5 to 500 μm.

6. The heat exchanger tube of claim 1, wherein the anti-corrosive reinforcement layer has an average thickness in a range of 10 to 100 μm.

* * * * *